Aug. 13, 1968 W. H. HIGHLEYMAN 3,397,404

CONSTANT CHARGE DRIVING CIRCUIT FOR ELECTROLYTIC RECORDERS

Filed May 20, 1964

INVENTOR.
WILBUR H. HIGHLEYMAN
BY
ATTORNEY

United States Patent Office 3,397,404

Patented Aug. 13, 1968

3,397,404

CONSTANT CHARGE DRIVING CIRCUIT FOR ELECTROLYTIC RECORDERS

Wilbur H. Highleyman, Murray Hill, N.J., assignor to Data Trends, Inc., Parsippany, N.J., a corporation of New Jersey Filed May 20, 1964, Ser. No. 368,947
2 Claims. (Cl. 346—74)

ABSTRACT OF THE DISCLOSURE

An electronic drive circuit for an electrolytic printer is disclosed which functions to deliver a constant charge of electricity to the printing electrodes for each applied input pulse in order to maintain a uniform degree of contrast between the recording medium and the data recorded thereon regardless of variations in the electrical resistance of the recording medium. The constant charge is achieved by providing a condenser charge and discharge circuit in combination with switching means so that the condenser either discharges through or is charged through the recording medium in response to the presence of a recording pulse.

This invention relates to electrolytic recorders and more particularly to a novel and useful driver circuit for recorders of this type.

As is well known to the art, electrolytic recorders use as a recording medium, a paper moistened with an electrolyte. When ions from a ferrous electrode are caused to pass through the recording medium, the iron ions react with the electrolyte to form a dark colored area in those locations corresponding to ion migration into the recording medium. For a showing in the prior art of the type of recording medium which the present invention is useful, reference may be had to U.S. Letters Patent 2,339,267 of 1944 to John V. L. Hogan et al.

One of the problems in this type of electrolytic recording is that the paper must be kept moist. Any drying of the paper results in an increase in its electrical resistance which changes the charge that is delivered per unit time of recording impulse. Variations in charge during the printing result in uneven coloration of the recording proper. It is known to store the recording medium within humidors in the recording apparatus. The printing electrodes which contact the recording medium may be located inside of the humidor but even then there is bound to be a variation in the electrical resistance of the recording medium especially when the apparatus is allowed to rest for appreciable periods of time.

Accordingly, it is the principal object of the present invention to provide a driving circuit for electrolytic recorders which is effective to deliver a constant charge to the recording medium for each recording impulse and thus maintain a constant degree of contrast between the recording medium and the recorded data regardless of changes in resistance of the recording medium.

A further object of the present invention is to provide a driving circuit for electrolytic recorders in which leakage current through the recording medium during non-recording intervals is held to a minimum.

Other objects will be apparent to those skilled in the art from a consideration of the following detailed description in conjunction with the attached sheet of drawings in which.

In general, the objects of the present invention are achieved by providing a condenser charge and discharge circuit in combination with switching means such that the condenser either discharges through or is charged through the recording medium in response to the presence of a recording pulse. Leakage current through the recording medium during non-recording intervals is held to a minimum through the use of appropriate diodes placed in the driver circuit.

Figure 1:
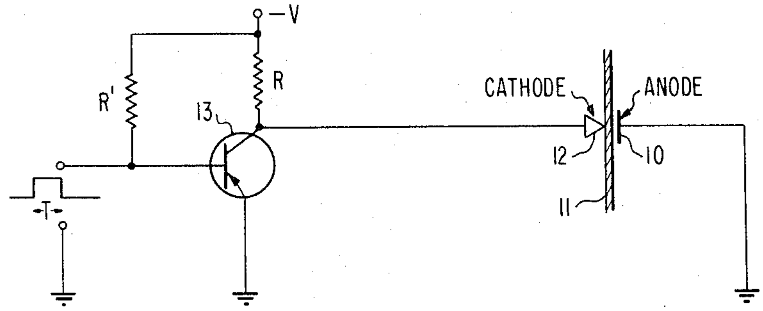
FIGURE 1 is a simple driver circuit for an electrolytic recorder.

Referring now to the drawings for a detailed description of the present invention, FIGURE 1 shows a greatly simplified form of electrolytic printing circuit which is effective to cause a migration of ions from the printing anode through the electrolytic printing medium whenever the switching circuit is pulsed to cut-off. The printing anode is indicated at 10, the electrolytic recording medium at 11, and the cathode printing electrode at 12. The PNP transistor shown at 13 has its collector connected to the cathode printing electrode and its emitter electrode connected to ground as is the anode electrode of the electrolytic printer. The transistor as shown is biased to saturation from a source of voltage indicated at −V through a resistor R′ connected to the base electrode. If the transistor is turned off for a time duration T, by application of a positive pulse to the base electrode, a charge $Q_p$ will then flow through the recording medium 11. If $R_p$ is the electrical resistance of the recording medium, then:

$$Q_p = I_p T = \frac{VT}{R + R_p}$$

Figure 2:
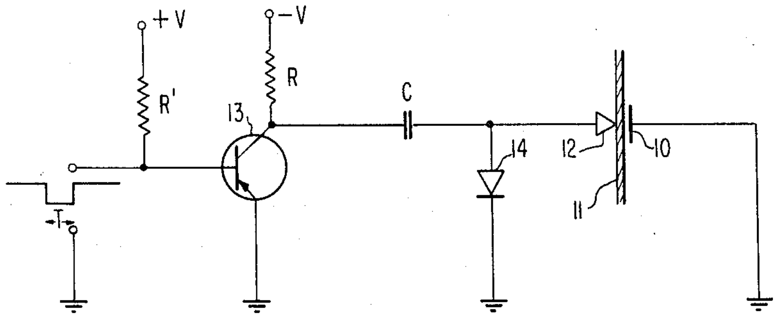
FIGURE 2 is a circuit similar to that shown in FIGURE 1 but modified in accordance with the present invention to provide a constant charge of electricity to the recording medium for each desired recording impulse.

From the foregoing equation, it will be obvious that for an increase in paper resistance, the charge flow decreases and the printed area therefore becomes lighter. In accordance with the present invention, it is possible to overcome this difficulty by revising the circuit and adding some additional components. One example of a circuit so revised is shown in FIGURE 2.

Here the same arrangement of printing electrodes and the same transistor are used but with the addition of a capacitor C connected between the cathode printing electrode and the collector electrode of the transistor. Also, a diode 14 is connected between the cathode printing electrode and ground. The transistor 13 is normally biased to cut-off from a source of voltage +V connected to the base electrode through a resistor R′. While it remains in this condition, the condenser will assume a negative potential on its left-hand plate and a ground potential on its right-hand plate. Whenever the transistor 13 is temporarily saturated by a negative pulse of time duration T applied to the base electrode, the capacitor will discharge through the closed circuit which includes the diode 14 and the transistor 13. At the end of the time period T when the transistor is again turned off, the capacitor will charge through the paper and the resistor R. The total charge $Q_p$ taken by the capacitor and, therefore, the charge which flows through the recording medium is:

$$Q_p = CV$$

Since this relationship is one in which the charge through the recording medium is independent of the resistance of the recording medium, the desired result is obtained. However, this introduces a new factor which must be taken into consideration and that is the time required for the capacitor to charge and thus for the printing to occur. The charge time, of course, will be proportional to the time constant $t$ where:

$$t=(R+R_p)C$$

Figure 3:
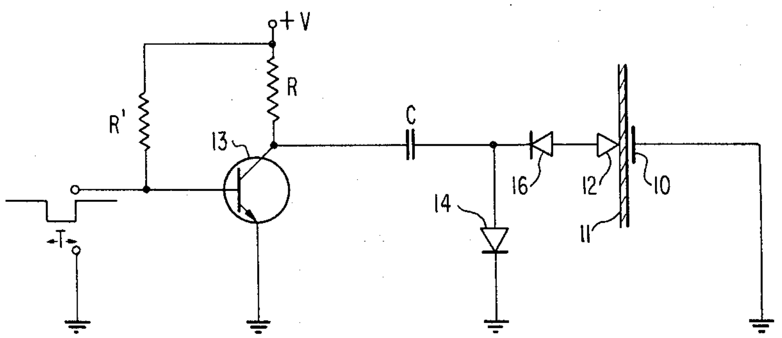
FIGURE 3 is a modification of the circuit shown in FIGURE 2.

With the circuit as shown in FIGURE 2, one problem Therefore, as the paper dries, the printed portion should not become lighter but will take longer to print. that arises is the fact that the condenser C will have to be rather large (for example, of the order of 10 mcirofarads). With a condenser of that size, there is apt to be a relatively large leakage current during non-recording intervals which will cause undesired marking of the recording medium. One solution to this difficulty is shown in the circuit of FIGURE 3. While this circuit is similar in many respects to the circuit of FIGURE 2, the transistor has been changed from a PNP to an NPN; is normally biased to saturation; and the condenser C is normally discharged. The principal difference between the circuits of FIGURES 2 and 3 is that in FIGURE 3 a second diode 16 has been added, connected in series, between the recording medium and the condenser. The addition of this second diode is effective substantially to prevent the flow of leakage current through the recording medium when no recording is desired.

In the operation of the circuit of FIGURE 3, printing is effected on the recording medium through the expedient of pulsing the transistor to cut-off for a time T as indicated by the negative pulse shown being fed to the base of the transistor. During the time period T, the condenser charges through the resistance R and the diode 14. The time T should be long enough to permit the condenser C to charge fully. Now we have a charge $Q_p$ of:

$$Q_p=CV\left(1-e^{-\frac{T}{RC}}\right)$$

being deposited on the capacitor through the resistance R and the diode. When the transistor is again saturated at the end of the time period T, the right-hand side of the capacitor goes negative and the capacitor discharges through the diode 16 and the recording medium. All of the charge on the capacitor is then passed through the paper. In this case, the discharge time constant "$t$" through the paper is:

$$t=R_pC$$

It will be apparent, therefore, that the time constant in this case is shorter than for the circuit shown in FIGURE 2. In addition, and since the leakage current is generated by a positive source, it will be blocked from the recording medium by the diode 16 and will flow instead through the diode 14.

Figure 4:
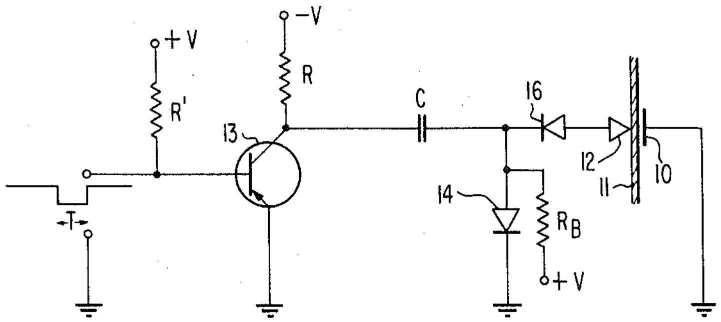
FIGURE 4 is a further modification of the circuit shown in FIGURE 2.

A further modification of the previously described circuits is shown in FIGURE 4. This circuit is quite similar to that of FIGURE 3 but utilizes a PNP transistor in combination with a positive biasing means for the two diodes. The bias resistor $R_B$ is chosen to pass a current through the diode 14 which is greater in magnitude than is the leakage through the condenser which guarantees that the diode 14 will be forward biased and the diode 16 will be reverse biased during non-printing intervals. The printing time of circuit of FIGURE 4 will be slightly longer than the printing for the circuit of FIGURE 3 due to the large time constant RC.

From the foregoing, it will be apparent to those skilled in the art that there are herein shown and disclosed several novel and useful circuits for use primarily as drivers for electrolytic recording apparatus. While preferred embodiments have been herein shown and/or disclosed, many changes in circuitry are possible and contemplated. For example, the diode connections in FIGURES 3 and 4 could be reversed along with reversal of the printing electrodes. Applicant claims the benefit of a full range of equivalents within the scope of the appended claims.

I claim:

1. A constant charge driver circuit for an electrolytic printer comprising:

(1) anode and cathode printing electrodes positionable in alignment and contacting opposite sides of the printing medium;
(2) an NPN transistor;
(3) means connecting said printing cathode to the collector of said transistor including a first diode and condenser connected in series, the anode of said diode being connected to said cathode printing electrode and the cathode of said diode being connected to said condenser;
(4) a second diode having its anode connected to the cathode of said first diode and its cathode connected to said printing anode;
(5) means biasing said transistor to a saturated state;
(6) and means for cutting off said transistor in response to information to be recorded permitting said condenser to charge through said second diode and said biasing means whereby when said transistor is returned to its saturated state, said condenser discharges through said first diode and the printing medium.

2. A constant charge driver circuit for an electrolytic printer comprising:

(1) anode and cathode printing electrodes positionable in alignment and contacting opposite sides of the recording medium;
(2) a PNP transistor;
(3) means connecting said printing cathode to the collector of said transistor, said means including a first diode and a condenser connected in series, the anode of said diode being connected to said cathode printing electrode and the cathode of said diode being connected to said condenser;
(4) a second diode having its anode connected to the cathode of said first diode and its cathode connected to said printing anode;
(5) means for biasing said first and second diodes;
(6) means normally biasing said transistor to cut-off;
(7) and means for saturating said transistor in response to information to be recorded causing said condenser to discharge through said transistor and said second diode, whereby when said transistor is returned to its off state, said condenser charges through the printing medium and said first diode to effect delivery of a constant charge to the printing medium.

References Cited

UNITED STATES PATENTS

| | | | |
|---|---|---|---|
| 3,166,753 | 1/1965 | Ryerson | 346—74 |
| 3,168,740 | 2/1965 | LaBorde | 346—74 |
| 3,254,346 | 5/1966 | Alexander | 346—74 |
| 3,296,497 | 1/1967 | Slatter | 307—88.5 |

BERNARD KONICK, *Primary Examiner.*

L. SCHROEDER, *Assistant Examiner.*